(12) United States Patent
Krasner

(10) Patent No.: US 8,886,225 B2
(45) Date of Patent: *Nov. 11, 2014

(54) POSITION DETERMINATION PROCESSES USING SIGNALS' MULTIPATH PARAMETERS

(71) Applicant: Qualcomm Incorporated, San Diego, CA (US)

(72) Inventor: Norman F. Krasner, Redwood City, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/758,534

(22) Filed: Feb. 4, 2013

(65) Prior Publication Data

US 2013/0150079 A1    Jun. 13, 2013

Related U.S. Application Data

(63) Continuation of application No. 11/836,643, filed on Aug. 9, 2007, now Pat. No. 8,369,873, which is a continuation of application No. 09/619,775, filed on Jul. 20, 2000, now Pat. No. 7,257,417.

(60) Provisional application No. 60/144,610, filed on Jul. 20, 1999.

(51) Int. Cl.
*G01S 19/26* (2010.01)
*H04W 64/00* (2009.01)
(Continued)

(52) U.S. Cl.
CPC .......... *H04W 64/006* (2013.01); *G01S 19/26* (2013.01); *G01S 19/254* (2013.01); *H04W 52/08* (2013.01); *H04B 17/0057* (2013.01); *G01S 11/02* (2013.01); *H04W 52/221* (2013.01); *G01S 11/06* (2013.01); *G01P 3/64* (2013.01); *G01P 3/50* (2013.01)
USPC .................. 455/456.3; 455/3.02; 342/357.78; 342/358

(58) Field of Classification Search
USPC .......... 455/456.1, 456.6, 436, 437, 440, 441, 455/456.3; 342/357.78, 358
See application file for complete search history.

(56) References Cited

U.S. PATENT DOCUMENTS

| 4,821,294 A | 4/1989 | Thomas, Jr. |
|---|---|---|
| 5,036,329 A | 7/1991 | Ando |

(Continued)

FOREIGN PATENT DOCUMENTS

| EP | 0429769 A2 | 6/1991 |
|---|---|---|
| EP | 0532485 A2 | 3/1993 |

(Continued)

OTHER PUBLICATIONS

International PCT Search Report, mailed Nov. 3, 2000, PCT/US 00/19905, 7 pgs.

(Continued)

*Primary Examiner* — Blane J Jackson
(74) *Attorney, Agent, or Firm* — Arnold J. Gum

(57) ABSTRACT

Methods and apparatuses for determining a position of a mobile satellite positioning system (SPS) receiver which is coupled to a communication receiver or transceiver. In one exemplary method, a change in a communication signal received by the communication receiver is determined. A parameter, based on the change, is determined, and SPS signals from SPS satellites are processed according to the parameter. According to further details of this method, the change involves the fluctuation of the level of the communication signal and the parameter is a motion information which specifies a frequency range for searching for SPS signals in the process of acquiring the SPS signals from SPS satellites. In an alternative embodiment the change in the communication signal is a change in the transmitted signal in response to power control commands. Apparatuses, such as a mobile communication system which includes an SPS receiver and a communication receiver, are also described.

28 Claims, 6 Drawing Sheets

(51) Int. Cl.
*G01S 19/25* (2010.01)
*G01S 11/02* (2010.01)
*G01S 11/06* (2006.01)
*G01P 3/64* (2006.01)
*G01P 3/50* (2006.01)
*H04W 52/08* (2009.01)
*H04B 17/00* (2006.01)
*H04W 52/22* (2009.01)

(56) References Cited

U.S. PATENT DOCUMENTS

| | | |
|---|---|---|
| 5,043,737 A | 8/1991 | Dell-Imagine |
| 5,119,101 A | 6/1992 | Barnard |
| 5,144,318 A | 9/1992 | Kishi |
| 5,239,667 A * | 8/1993 | Kanai ............... 455/10 |
| 5,379,324 A | 1/1995 | Mueller et al. |
| 5,381,338 A | 1/1995 | Wysocki et al. |
| 5,396,253 A | 3/1995 | Chia |
| 5,446,465 A | 8/1995 | Diefes et al. |
| 5,510,797 A | 4/1996 | Abraham et al. |
| 5,548,296 A | 8/1996 | Matsuno |
| 5,585,805 A | 12/1996 | Takenaka et al. |
| 5,771,456 A * | 6/1998 | Pon ............... 455/456.2 |
| 5,774,829 A | 6/1998 | Cisneros et al. |
| 5,812,087 A | 9/1998 | Krasner |
| 5,841,396 A * | 11/1998 | Krasner ............... 342/357.75 |
| 5,859,612 A | 1/1999 | Gilhousen |
| 5,874,913 A | 2/1999 | Blanchard et al. |
| 5,883,594 A | 3/1999 | Lau |
| 5,917,444 A | 6/1999 | Loomis et al. |
| 6,023,242 A | 2/2000 | Dixon |
| 6,061,019 A | 5/2000 | Miyoshi |
| 6,085,091 A * | 7/2000 | Yoo et al. ............... 455/441 |
| 6,111,538 A | 8/2000 | Schuchman et al. |
| 6,278,404 B1 | 8/2001 | Niles |
| 6,285,884 B1 | 9/2001 | Vaara |
| 6,313,786 B1 | 11/2001 | Sheynblat et al. |
| 6,317,612 B1 | 11/2001 | Farsakh |
| 6,377,813 B1 | 4/2002 | Kansakoski et al. |
| 6,400,310 B1 | 6/2002 | Byrnes et al. |
| 6,542,745 B1 | 4/2003 | Mottier et al. |
| 6,546,040 B1 | 4/2003 | Eschenbach |
| 6,577,603 B1 | 6/2003 | Hakalin et al. |
| 6,704,650 B1 | 3/2004 | Fuller et al. |
| 6,768,907 B1 | 7/2004 | Mohebbi |
| 7,193,559 B2 | 3/2007 | Ford et al. |
| 7,257,417 B1 | 8/2007 | Krasner |
| 7,280,071 B2 | 10/2007 | Awata |
| 7,764,231 B1 * | 7/2010 | Karr et al. ............... 342/457 |
| 8,369,873 B2 | 2/2013 | Krasner |
| 2003/0231704 A1 | 12/2003 | Tanaka et al. |

FOREIGN PATENT DOCUMENTS

| | | |
|---|---|---|
| EP | 1117197 A2 | 7/2001 |
| EP | 1252773 | 10/2002 |
| GB | 2305825 A | 4/1997 |
| JP | 03104330 | 5/1991 |
| JP | 03293577 | 12/1991 |
| JP | 04359177 | 12/1992 |
| JP | 6289117 | 10/1994 |
| JP | 09166655 | 6/1997 |
| JP | 10023532 | 1/1998 |
| JP | 10190557 | 7/1998 |
| JP | 10261989 | 9/1998 |
| JP | 11109020 | 4/1999 |
| WO | 9816079 | 4/1998 |

OTHER PUBLICATIONS

Written Opinion—PCT/US00/19905, International Search Authority, European Patent Office, Jun. 19, 2001.

* cited by examiner

POSITION DETERMINATION PROCESSES USING SIGNALS' MULTIPATH PARAMETERS

This application is a continuation of and hereby claims the benefit of the filing date of U.S. patent application Ser. No. 11/836,643, filed Aug. 9, 2007, which is a continuation of U.S. patent application Ser. No. 09/619,775, filed Jul. 20, 2000 by Norman F. Krasner and entitled "Method for Determining A Change in A Communication Signal And Using This Information To Improve SPS Signal Reception And Processing," which is a non-provisional of U.S. provisional application No. 60/144,610, filed Jul. 20, 1999, all of which are assigned to the assignee hereof and incorporated by reference in their entirety.

BACKGROUND

It is known that the motion of mobile satellite position system (SPS) receivers (e.g. a Global Positioning System receiver), particularly while attempting to acquire SPS signals from an SPS satellite, will effect the position determination function of the SPS receiver. The faster the velocity of the mobile SPS receiver, the more time consuming is the acquisition/search process. Tracking (after acquisition) of SPS signals is also effected by faster velocities of the mobile SPS receiver. These problems are caused by Doppler effects from the motion of the SPS receiver, which are compounded by the motion of the orbiting SPS satellites which are moving at high velocities. Several techniques are known in the art for predicting the Doppler effects due to the motion of the SPS satellites. These techniques are particularly useful for stationary SPS receivers (which may be capable of moving). Such techniques are described in U.S. Pat. Nos. 4,445,118 and 5,841,396; and PCT Publication No. WO 98/25157. These techniques usually assume that the SPS receiver is essentially stationary (e.g. fixed on the surface of the earth or moving slowly, such as the speed of a person walking). When the SPS receiver is moving in a car, the effective Doppler effect due to the rapid movement of the SPS receiver, may be considerably different than an estimated Doppler for a stationary SPS receiver. Thus, the techniques in the prior art, while normally helpful for many situations, may not be advantageous when the SPS receiver is moving at high velocities.

SUMMARY OF THE INVENTION

The present invention relates to methods and apparatuses for determining a change in a communication signal and using information related to this change to affect the processing (e.g. reception of) SPS signals. In one exemplary method, a change in a communication signal received by a communication receiver is determined. A parameter, based on the change, is determined, and SPS signals from SPS satellites are processed according to the parameter. For example, the parameter may be representative of a motion information which may be used to determine a frequency range for searching for SPS signals in the process of acquiring the SPS signals from at least one SPS satellite. Examples of such motion information include a fade rate or time between fades of the envelope of the communication signal. In an alternative example, a change in the level of the communication signal transmitted by a communication transceiver is monitored, or the commands for altering such a level are monitored.

Apparatuses are also described, such as a mobile communication system which includes an SPS receiver and a communication receiver.

BRIEF DESCRIPTION OF THE DRAWINGS

The present invention is illustrated by way of example, and not by limitation, in the figures of the accompanying drawings in which like references indicate similar elements.

DETAILED DESCRIPTION

Figure 1:
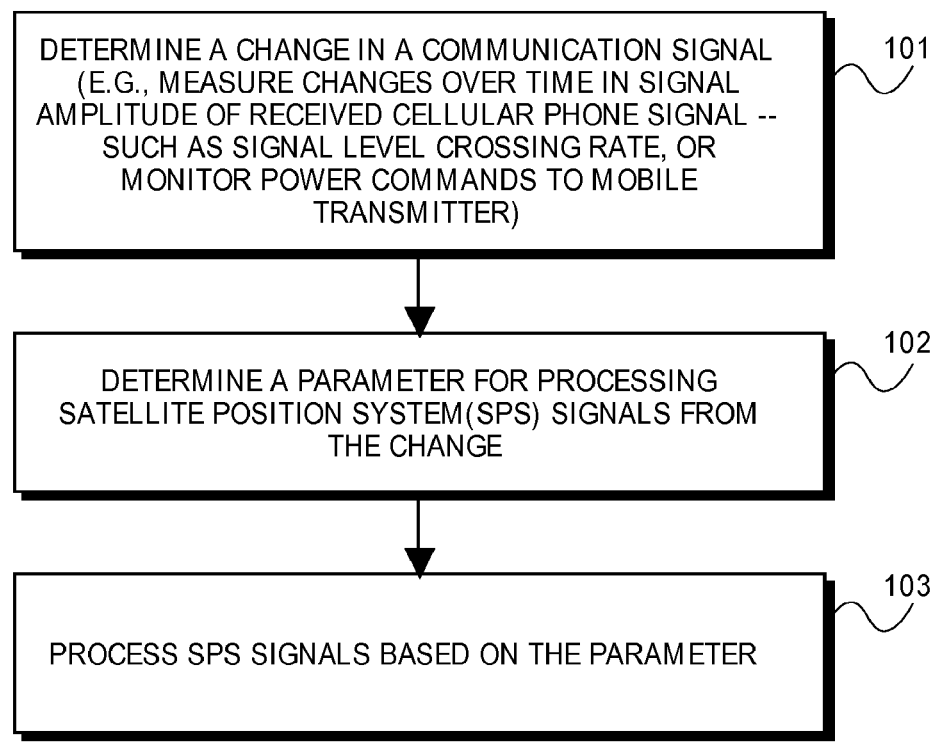
FIG. 1 shows a flowchart which depicts an exemplary method according to one aspect of the present invention.

Methods and apparatuses signals are described for determining a change in a communication signal and using information related to this change in processing SPS. The following description and drawings are illustrative of the invention and are not to be construed as limiting the invention. In the following description, for purposes of explanation, numerous specific details are set forth in order to provide a thorough understanding of the present invention. It will be evident, however, to one skilled in the art that the present invention may be practiced without these specific details. In other instances, well known structures and devices are shown in block diagram form to facilitate explanation.

This invention, in one embodiment, deals with processing satellite positioning system (SPS) signals, such as GPS (Global Positioning System) signals from GPS satellites, when the SPS receiver is capable of undergoing movement. Under such conditions when the SPS receiver is moving, the frequencies of the GPS signals are shifted due to the Doppler effect from the motion of the SPS receiver. This makes it more difficult to acquire GPS signals and also can cause difficulties in tracking the signals. If an auxiliary source of information were available to provide motion information to the GPS receiver, the receiver could utilize this information to alter its acquisition strategies. For example, if it were known that there was little motion, then the Doppler effect (due to motion of the GPS receiver) would be minor and the GPS receiver could avoid long searches over wide Doppler regions, a process that often results in very long acquisition times.

This invention, in one embodiment, provides a method for determining such platform motion, when the GPS receiver is integrated with, or is in proximity with an operational communications device.

This invention has the advantage in that specialized external equipment used to determine motion, such as accelerometers, gyros, speedometers, etc. may be avoided. Such equipment may be expensive, require extensive installation, and may be unwieldy, especially for cost sensitive mobile consumer applications.

A preferred embodiment of the invention is a cell phone with an integrated GPS receiver. However, the invention will work equally well for cell phones or other communication devices that are in communication with a cell phone (e.g. over a serial wired link or even a short range wireless link), where the cell phone is in close proximity to the communication system and where both share similar platform motion.

A method, according to one embodiment of the invention, observes the fluctuations of the envelope or other signal parameters of the communication signal and derives from these fluctuations velocity information, which is then used to determine how to process (e.g. search for) GPS signals.

It is well known that in mobile situations cellular type signals undergo rapid signal level fluctuations due to interference from received signals provided to the mobile from several paths. For example, a cellular signal may be received directly from a cell phone tower and may be received after being reflected off the ground. Alternatively, a cell phone signal may be received from a multiplicity of reflections off nearby buildings.

In a reflection environment it is known that the probability distribution of the envelope of a received signal, especially if it is narrowband, follows a Raleigh probability distribution. Furthermore, as one moves along a line the received signal typically goes from a peak value to a small value within a distance of one-half carrier wavelength. This fading is actually statistical so that the amplitude of the envelope is nearly statistically independent between measurements when such measurements are made ½ wavelength apart. A discussion on the fading phenomena, including measurements is provided in G. A. Arrendondo, et al., "Advanced Mobile Phone Service, Voice and Data Transmission," pp. 303-315, *Bell System Technical Journal*, January 1979.

For example, at 850 MHz, a cell phone band, the independent fades are around 7 inches apart. Thus, as a vehicle or other moving platform moves, the envelope will appear to move up and down, and the average rate at which this motion occurs is a function of the speed of the platform. One measure of this rate is found by the so-called level crossing rate. The mean value of the envelope is found and a level is set a prescribed amount below it, for example 10 dB below the mean value. The number of occurrences are measured over a period of time, say 10 seconds, when the signal level drops below this lower threshold. The rate of such threshold crossings is a measure of the fade rate. For example, at around 850 MHz it can be shown that at a speed of 20 miles per hour the fade rate for a −10 dB threshold relative to the mean is around 18 times per second. An alternative measure is the average duration of fades below a threshold. At 20 miles per hour at 850 MHz the average fade duration is around 5 msec. The fade rate is proportional to the vehicle speed and is also proportional to the frequency of the received signal. Similarly, the fade duration is inversely proportional to these quantities.

Accordingly, an exemplary method of the invention monitors the received signal of a cell phone or other communication device in proximity to or integrated with a GPS receiver, and uses the fading statistics of the received communication signal's carrier, or other multipath related statistics of the received signal, to estimate the speed of the mobile platform. The estimated speed of the mobile platform is used to control the acquisition or processing of GPS signals received by the GPS receiver in proximity to the communication device. The acquisition of a GPS signal often involves a search for the signal's carrier frequency. This frequency is in turn altered by two sources of Doppler: (1) Doppler due to the GPS satellite's motion relative to the earth and (2) Doppler due to the receiver platform's motion. Knowing the platform's speed then assists in developing an appropriate acquisition strategy. For example, if the estimated speed is low (suggesting that the platform is essentially stationary), then the amount of frequency (or Doppler) searching required to acquire a GPS signal from a GPS satellite may be reduced. On the other hand, if the estimated speed is high, then the amount of such frequency searching may be increased. Intermediate levels of Doppler searching may be performed when the estimated speed is between a low level and a high level. Thus, the level of Doppler uncertainty may be determined from the estimated speed (obtained from the fading statistics) and this level of Doppler uncertainty may be used to determine the level of searching for Doppler shifts (e.g. the number of Doppler bins to search may be based on the level of Doppler uncertainty).

Models for fading phenomena for mobile systems are provided in Lee (see William C. Y. Lee, *Mobile Communications Design Fundamental*, pp. 100-105, Howard Sams & Co., 1986). The model produces equations for the number of level crossings (one direction only—e.g. positive) per second, n(R) and the time below a given level R (called the "fade duration") are:

$$n(R) = \sqrt{2\pi} \, (V/\lambda) \mathrm{Re}^{-R^2} \qquad (1)$$

$$t(R) = \frac{1 - e^{-R^2}}{\sqrt{2\pi} \, (V/\lambda) \mathrm{Re}^{-R^2}} \qquad (2)$$

Here R is the level normalized by the RMS signal level, V is the mobile velocity and $\lambda$ is the signal wavelength. Note that the level crossing rate is proportional to frequency and the fade duration is inversely proportional. For example, for a vehicle going 30 miles per hour, or 13.4 meters/sec, and a level set to 10 dB below the RMS we get for these quantities, n(R)=27.2 crossings per second and 3.49 milliseconds. Of course these numbers are averages and an individual measurement over a short period, such as one second, may differ significantly from these averages, due to statistical fluctuations and variations from the model used to predict these numbers. Nevertheless these equations are good predictors of trends.

FIG. 1 shows a flowchart depicting one generalized example of the present invention. In operation 101, a change in a communication signal is determined. This communication signal may be a cellular telephone signal which employs a code division multiple access (CDMA) technique for distinguishing between different receivers. Alternatively, it may be an AMPS analog cellular system, or a GSM time division multiple access cellular system, or even a paging type system. The change which is typically measured is a change over time in a signal amplitude or other signal level of the received communication signal. As noted above, one such measurement is the signal level crossing rate. Operation 102 determines a parameter from this change which has been measured in operation 101. This parameter is used for processing SPS signals. The processing of SPS signals occurs in operation 103, and the manner in which the SPS signals are processed is determined at least in part based upon the parameter.

Figure 2:
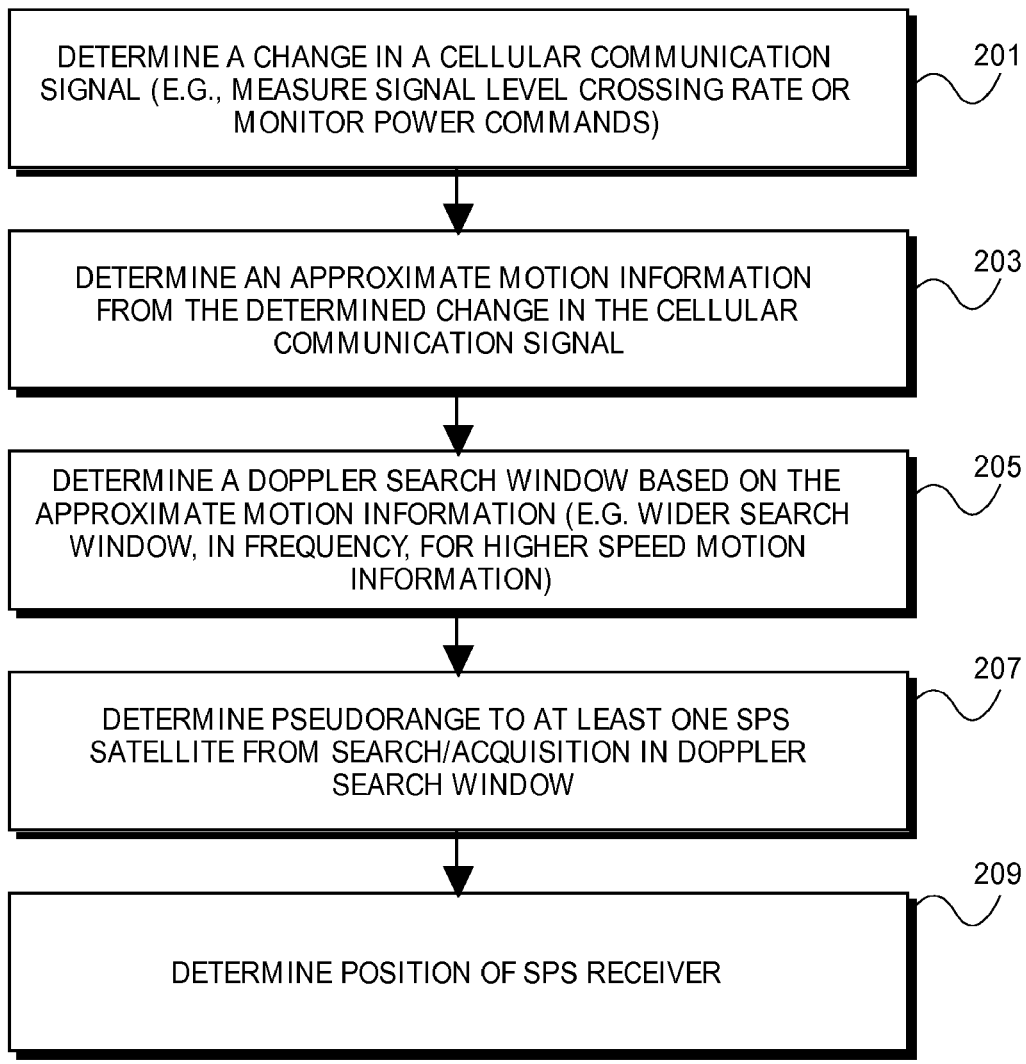
FIG. 2 shows a flowchart which shows another method according to the present invention.

FIG. 2 illustrates a more specific method according to one embodiment of the present invention. In operation 201, a change is determined in the cellular communication signal. As noted in FIG. 2, this change may be a measurement in the signal level crossing rate. In operation 203, an approximate motion information is determined from the change in the cellular communication signal. This may be performed by a lookup table or other techniques for converting from the measured information regarding the change in the cellular communication signal to an approximate motion information. For example, equations (1) and (2) may be used, or the Bell System Technical Journal referred to above shows various graphs which may be employed to convert from the change measured in operation 201 into a motion information determined in operation 203.

The motion information will then be used in operation 205 in order to determine a Doppler search window based upon the approximate motion information. Those in the art will recognize that motion information which indicate a faster speed will require a wider search window in frequency than motion information which indicate a lower speed. In operation 207, a pseudorange to at least one SPS satellite is determined by searching in this Doppler search window specified in operation 205 in order to acquire SPS signals. Then in operation 209, the position of the SPS receiver may be determined using conventional techniques.

It will be appreciated that the foregoing methods may be practiced with other techniques known in the art, including those which utilize Doppler information relative to the orbiting SPS satellites. For example, U.S. Pat. No. 5,841,396 describes a technique for providing approximate Doppler information to a mobile SPS receiver or for use with a mobile SPS receiver. This Doppler information may be used in conjunction with the approximate motion information of the present invention in order to determine an appropriate search window over an appropriate frequency range based upon the Doppler associated with the SPS satellite as well as the Doppler associated with the motion information determined according to the present invention. Furthermore, various cell based information sources may be used as described in PCT Publication No. WO 98/25157. For example, the determination of a specific cell site which is in communication with the communication receiver may specify a Doppler information with respect to at least one SPS satellite and this Doppler information may be used in conjunction with the motion information determined according to the present invention in order to specify a frequency range/search window in the acquisition process of an SPS signal. Thus, it will be appreciated that the present invention may be combined with other techniques for improving the acquisition or tracking of SPS signals such as those described in U.S. Pat. No. 5,841,396, which is hereby incorporated herein by reference, and co-pending U.S. patent application Ser. No. 08/842,559, filed Apr. 15, 1997, which is hereby incorporated herein by reference.

Figure 3:
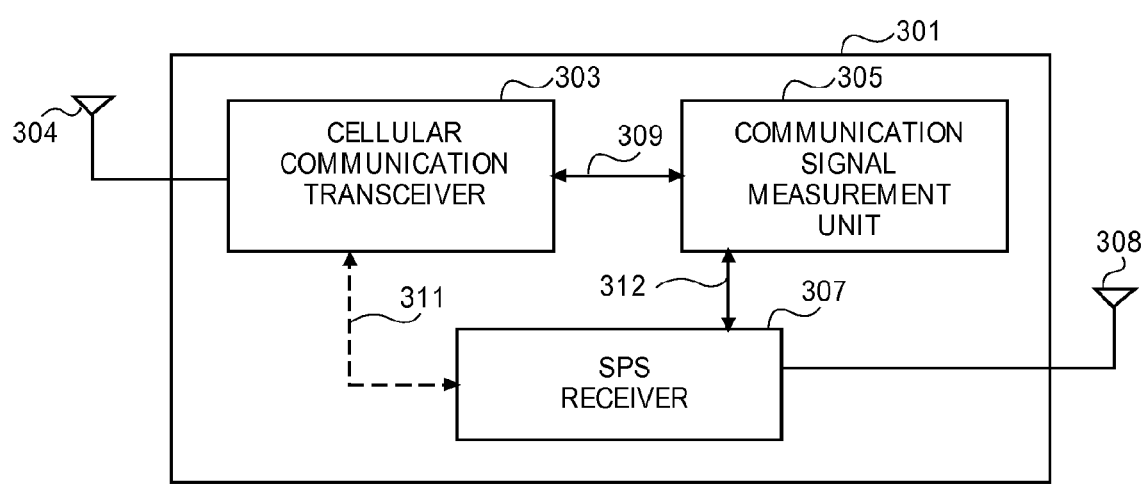
FIG. 3 shows an example of an apparatus according to the present invention.

FIG. 3 shows one embodiment of a mobile system 301 according to the present invention. The mobile system 301 includes a cellular communication transceiver 303 and an SPS receiver 307, each of which is coupled to a communication signal measurement unit 305. The communication signal measurement unit 305 is coupled by channel 309 to the cellular communication transceiver 303. It will be appreciated that the measurement unit 305 may be considered part of or integrated with the cellular communication transceiver 303. For example, many cellular communication transceivers include signal measurement units. The SPS receiver 307 is coupled to the communication signal measurement unit 305 by a channel 312 which provides a measurement or a parameter for use by the SPS receiver 307 according to the techniques and methods described herein. The SPS receiver 307 may optionally be coupled to the cellular communication transceiver 303 by an optional channel 311 which may be used to supply Doppler information or other assistance information to the SPS receiver 307 through a cellular communication link to a base station or other source (e.g. SPS servers such as those described in co-pending U.S. patent application Ser. No. 08/842,559, filed Apr. 15, 1997). Cellular communication signals are received and/or transmitted through antenna 304. SPS signals from SPS satellites are received through SPS antenna 308. It will be appreciated that in certain embodiments these antennas 304 and 308 may be shared. The SPS receiver 307 may be a conventional GPS receiver or it may be a GPS receiver such as that described in U.S. Pat. No. 6,002,363 or the GPS receivers described in U.S. Pat. No. 5,663,734. Other types of SPS receivers may also be utilized, such as conventional correlation based GPS receivers. The cellular communication transceiver 303 may be a CDMA cellular telephone transceiver or a GSM cellular telephone transceiver, an AMPS transceiver, or a variety of others commonly in use. The communication signal measurement unit 305 is coupled by channel 309 to a source in transceiver 303 to the received cellular signal in order to measure the cellular signal. The measurement of this cellular signal may be according to conventional techniques for measuring the signal level crossing rate as described herein. The measurement of this signal level crossing rate may then be used to determine a motion information as described herein. For example, a lookup table which converts from the signal level measuring rate to an estimated velocity may be performed by the measurement unit 305. This velocity may then be provided by channel 312 to the SPS receiver 307 which accordingly modifies the frequency search window for acquiring SPS signals based upon the approximate motion information specified by the measurement unit 305.

Figure 4:
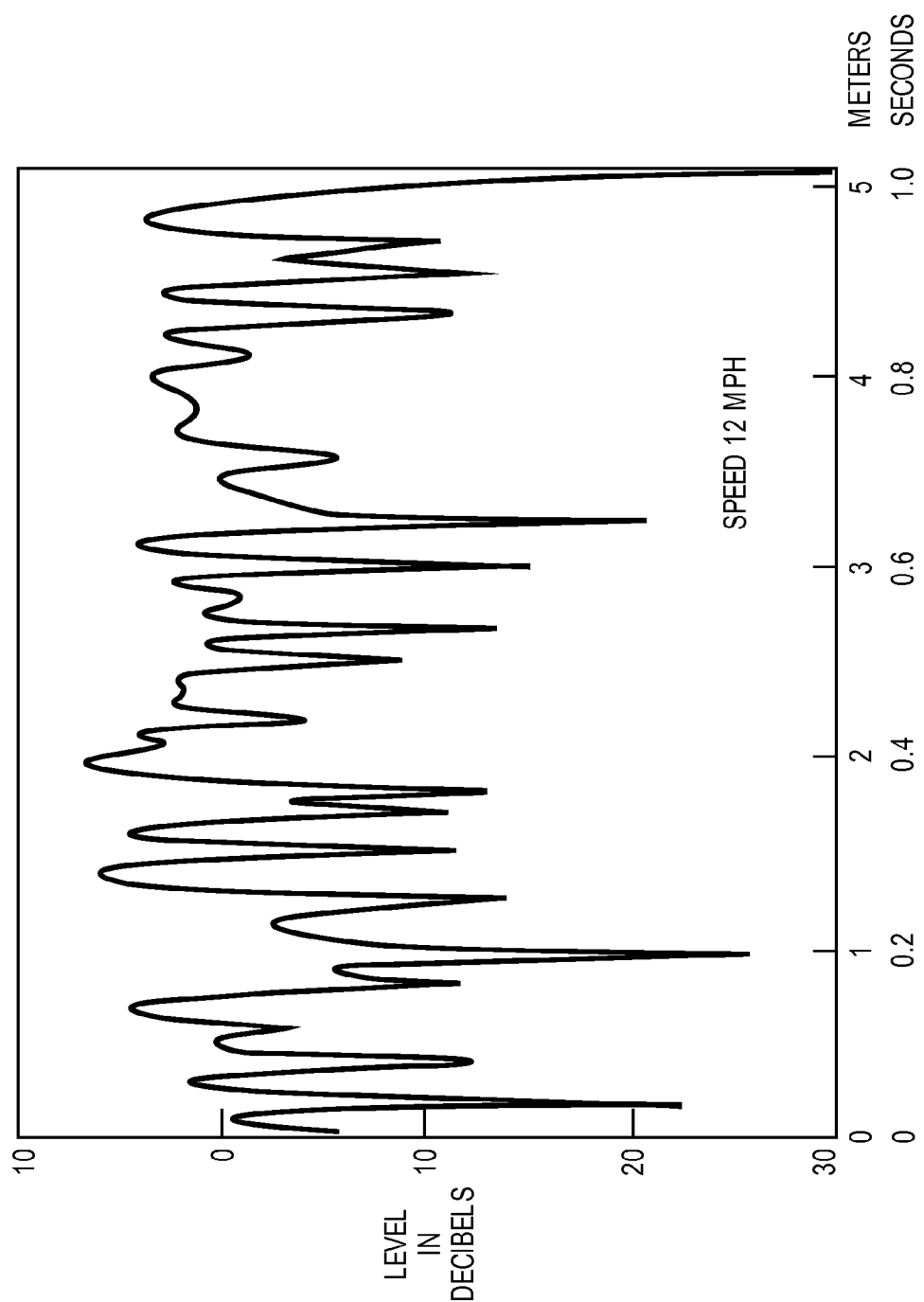
FIG. 4 shows an example of a measured Rayleigh envelope.
Figure 5:
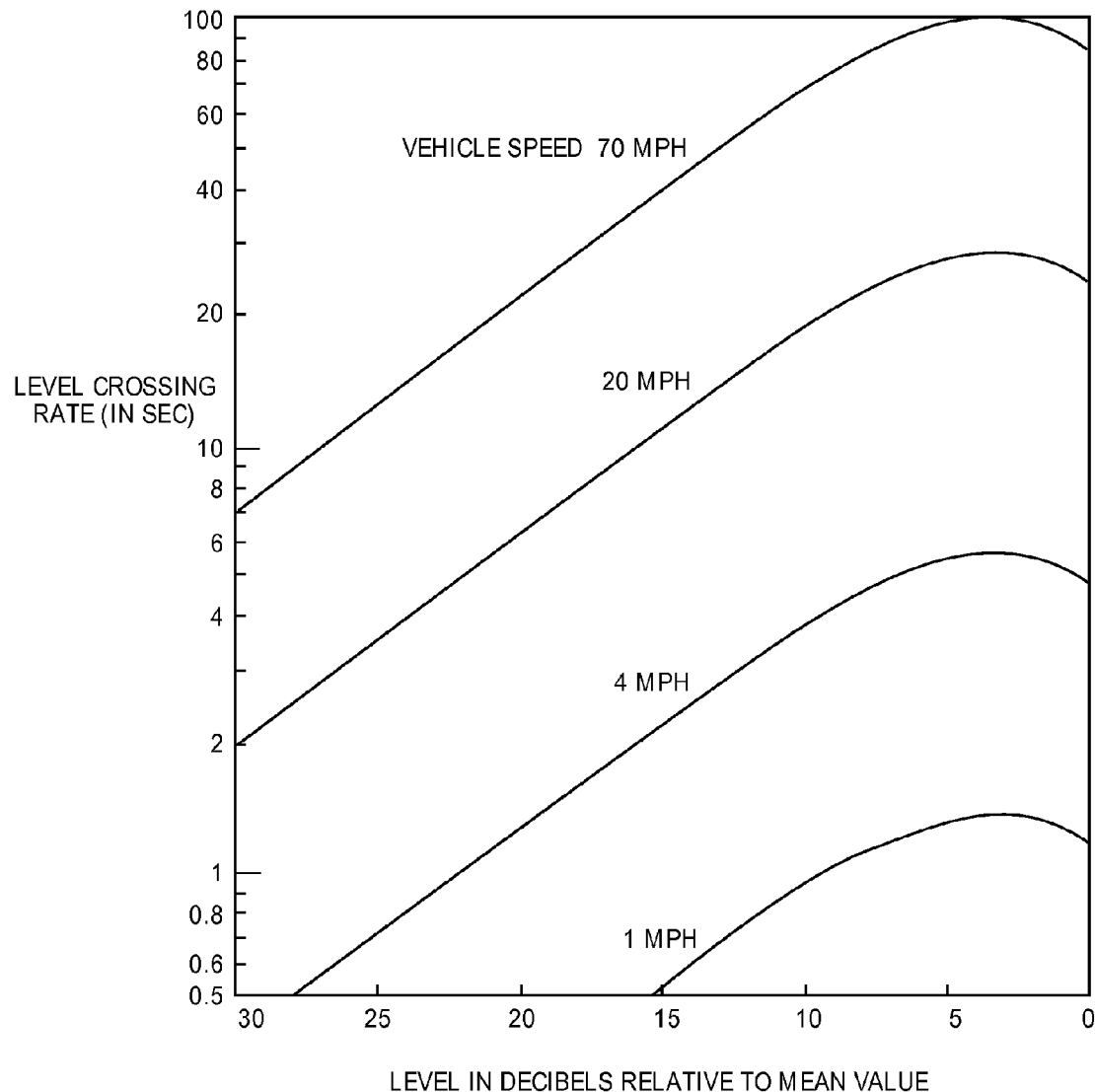
FIG. 5 shows an example of a graph depicting signal level crossing rate relative to a specified level in decibels.
Figure 6:
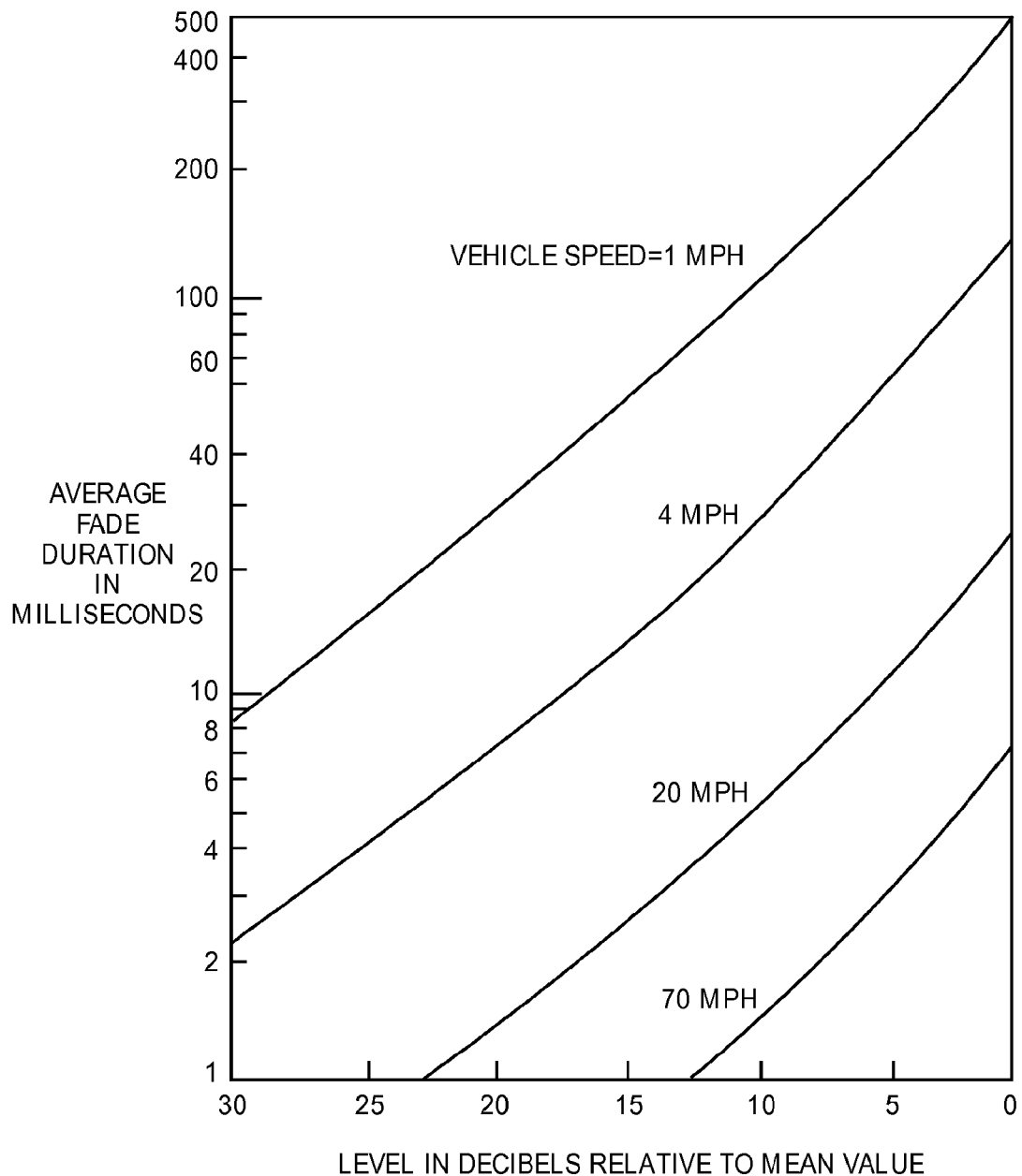
FIG. 6 shows an example of a graph depicting mean fade duration for various vehicle speeds.

FIG. 4 shows an example of a measured Rayleigh envelope where, at a speed of 12 miles per hour (MPH) the signal's level varies. This changing signal level can be measured in various ways and depicted in graphs. These graphs may be used to create lookup tables which can be used to determine the speed of a moving communication system. FIG. 5 shows an example of a graph of the signal crossing rate relative to level in decibels. A measured signal level crossing rate may be used to derive an estimated speed from graphs such as FIG. 5. FIG. 6 is an example of a graph showing mean fade duration for various vehicle speeds; a measured mean fade duration may be used to derive an estimated speed from graphs such as FIG. 6.

Other Measures of Speed

As indicated previously a variety of methods are possible to estimate the speed of the platform based upon the received communication signal's statistics. The variation in the envelope of this signal is convenient. This variation may be performed by examining an AGC control voltage or signal that is used to control the communication signal's level within the receiving chain. Often the average received signal level is provided as a measure of receiver strength, a so-called RSSI (receiver signal strength indicator). However, in some situations this RSSI is not measured at a rapid rate and hence the ability to determine rapid envelope fluctuations may be compromised.

Another method of monitoring the variation of the communication signal's strength is to monitor power control commands of the cellphone (or other mobile communication device) transmitter. In CDMA systems, it is often the case that a cellular basestation sends power control commands to the mobile and in turn the mobile's transmit power is adjusted such that the basestation receives the mobile's signal at a prescribed level. This is called closed loop power control. Often these power control commands occur at a high rate, such as once per millisecond, so that the mobile's transmitter can compensate for Rayleigh fading as observed by the basestation. The power control commands are typically up/down commands with small increments, such as 1 dB. These commands can be converted to actual transmit levels by accumulating such increments. Using this technique of monitoring the power control commands for the transmitter of the cell phone (or other communication device), a method similar to that shown in FIG. 1 or 2 may be performed to use the change in the cell phone's (or other communication system's) transmitted signal to determine a manner in which SPS signals are processed.

One should notice in the above method that the parameter that is effectively monitored is the level of the transceiver's transmitted power of the mobile rather than received power of signals received at the mobile system's receiver. Of course, in an alternative embodiment, one may directly monitor the transceiver's transmitted power rather than monitor power control commands. However, power control commands, being typically digital in nature, lend themselves to a straightforward implementation.

Although the methods and apparatus of the present invention has been described with reference to GPS satellites, it will be appreciated that the teachings are equally applicable to positioning systems which utilize pseudolites or a combination of pseudolites and satellites. Pseudolites are ground-based transmitters which broadcast a PN code (similar to the GPS signal) modulated on an L-band carrier signal, generally synchronized with GPS time. Each transmitter may be assigned a unique PN code so as to permit identification by a remote receiver. Pseudolites are useful in situations where GPS signals from an orbiting satellite might be unavailable, such as tunnels, mines, buildings, or other enclosed areas. The term satellite, as used herein, is intended to include pseudolites or equivalents of pseudolites and the term GPS signals, as used herein, is intended to include GPS-like signals from pseudolites or equivalents of pseudolites. In the preceding discussion, the invention has been described with reference to application upon the United States Global Positioning System (GPS) system. It should be evident, however, that these methods are equally applicable to similar satellite positioning systems, such as the Russian Glonass system. The term GPS used herein includes such alternative satellite positioning systems, including the Russian Glonass system. The term "GPS signals" includes signals from alternative satellite positioning systems.

Although the present invention has been described with reference to specific exemplary embodiments, it will be evident that various modifications and changes may be made to those embodiments without departing from the broader spirit and scope of the invention as set forth in the claims.

What is claimed is:

1. A mobile device comprising:
   means for receiving communication signals from a stationary transmitter, the communication signals having associated communication signal envelopes;
   means for processing the communication signals envelopes to determine one or more multipath-related parameters;
   means for determining motion information of the mobile device relative to the stationary transmitter using the one or more multipath-related parameters; and
   means for determining a Doppler search window based on the motion information of the mobile device determined using the one or more multipath-related parameters, the Doppler search window being used to search and acquire signals of a positioning system used to determine a position of the mobile device.

2. The mobile device of claim 1, wherein the one or more multipath-related parameters comprise one or more parameters indicative of fading of the communication signals.

3. The mobile device of claim 2, wherein the means for processing the communication signal envelopes to determine the one or more parameters indicative of fading of the communication signals comprise means for determining a signal level crossing rate.

4. The mobile device of claim 1, further comprising means for determining position of the mobile device.

5. The mobile device of claim 4, further comprising:
   means for determining one or more positioning parameters based on the motion information, and wherein the means for determining position of the mobile device accesses the one or more parameters for determining the position of the mobile device.

6. The mobile device of claim 4, wherein the means for determining position of the mobile device comprises means for accessing the motion information and performing positioning based on the motion information.

7. The mobile device of claim 6, wherein the means for accessing the motion information and performing positioning based on the motion information comprises performing positioning based on determining that the motion information indicates the mobile device is essentially stationary.

8. The mobile device of claim 1, wherein the means for determining motion information of the mobile device relative to the stationary transmitter using the one or more multipath-related parameters comprises means for determining a speed of the mobile device.

9. The mobile device of claim 8, wherein the communication signals are communication signals of a particular communication channel, and wherein the means for determining a speed of the mobile device comprise means for determining the speed of the mobile device using a frequency of the particular communication channel and the one or more multipath-related parameters.

10. A method of processing communication signals received at a mobile device comprising:
    receiving communication signals from a stationary transmitter, the communication signals having associated signal envelopes;
    processing the communication signals envelopes to determine one or more multipath-related parameters;
    determining motion information of the mobile device relative to the stationary transmitter using the one or more multipath-related parameters; and
    determining a Doppler search window based on the motion information of the mobile device determined using the one or more multipath-related parameters, the Doppler search window being used to search and acquire signals of a positioning system used to determine a position of the mobile device.

11. The method of claim 10, wherein the one or more multipath-related parameters comprise one or more parameters indicative of fading of the communication signals.

12. The method of claim 11, wherein processing the communication signal envelopes to determine the one or more parameters indicative of fading of the communication signals comprises determining a signal level crossing rate.

13. The method of claim 10, further comprising determining position information of the mobile device.

14. The method of claim 13, further comprising wherein determining positioning information of the mobile device comprises determining one or more positioning parameters based on the motion information.

15. The method of claim 13, wherein the determining position information of the mobile device comprises accessing the motion information and performing positioning based on the motion information.

16. The method of claim 15, wherein accessing the motion information and performing positioning based on the motion information comprises performing positioning based on determining that the motion information indicates the mobile device is essentially stationary.

17. The method of claim 10, wherein determining motion information of the mobile device relative to the stationary transmitter using the one or more multipath-related parameters comprises determining a speed of the mobile device.

18. The method of claim 17, wherein the communication signals are communication signals of a particular communication channel, and wherein determining a speed of the mobile device comprise determining the speed of the mobile device using a frequency of the particular communication channel and the one or more multipath-related parameters.

19. A mobile device comprising:
 a communication receiver configured to receive communication signals from a stationary transmitter, the communication signals having associated signal envelopes;
 processor circuitry in communication with the communication receiver and configured to process the communication signals envelopes to determine one or more multipath-related parameters, to determine motion information of the mobile device relative to the stationary transmitter using the one or more multipath-related parameters, and to determine a Doppler search window based on the motion information of the mobile device determined using the one or more multipath-related parameters, the Doppler search window used to search and acquire signals of a positioning system used to determine a position of the mobile device.

20. The mobile device of claim 19, wherein the one or more multipath-related parameters comprise one or more parameters indicative of fading of the communication signals.

21. The mobile device of claim 20, wherein the processor circuitry is configured to determine the one or more parameters indicative of fading of the communication signals by determining a signal level crossing rate.

22. The mobile device of claim 19, further comprising a positioning receiver.

23. The mobile device of claim 22, wherein the processor circuitry is further in communication with the positioning receiver and further configured to determine one or more positioning parameters based on the motion information.

24. The mobile device of claim 22, wherein the processor circuitry is further in communication with the positioning receiver and further configured to access the motion information and performing positioning based on the motion information.

25. The mobile device of claim 24, wherein the means for accessing the motion information and performing positioning based on the motion information comprises performing positioning based on determining that the motion information indicates the mobile device is essentially stationary.

26. The mobile device of claim 19, wherein the processor circuitry is confirmed to determine a speed of the mobile device using the one or more multipath-related parameters.

27. The mobile device of claim 26, wherein the communication signals are communication signals of a particular communication channel, and wherein the processor circuitry is configured to determine the speed of the mobile device using a frequency of the particular communication channel and the one or more multipath-related parameters.

28. A computer program product residing on a non-transitory processor-readable medium and comprising processor-readable instructions that, when executed on a processor, cause operations comprising:
 receiving communication signals from a stationary transmitter, the communication signals having associated signal envelopes;
 processing the communication signals envelopes to determine one or more multipath-related parameters;
 determining motion information of the mobile device relative to the stationary transmitter using the one or more multipath-related parameters; and
 determining a Doppler search window based on the motion information of the mobile device determined using the one or more multipath-related parameters, the Doppler search window being used to search and acquire signals of a positioning system used to determine a position of the mobile device.

* * * * *